United States Patent
Ye et al.

(10) Patent No.: US 8,845,165 B2
(45) Date of Patent: Sep. 30, 2014

(54) LIGHT SOURCE FOR CRYSTAL LAMP

(75) Inventors: Zhi-Ting Ye, Miao Li County (TW); Kuo-Jui Huang, Tai Chung County (TW)

(73) Assignees: Dongguan Masstop Liquid Crystal Display Co., Ltd., Dongguan (CN); Wintek Corporation, Taichung (TW)

( * ) Notice: Subject to any disclaimer, the term of this patent is extended or adjusted under 35 U.S.C. 154(b) by 226 days.

(21) Appl. No.: 13/304,049

(22) Filed: Nov. 23, 2011

(65) Prior Publication Data

US 2012/0134171 A1 May 31, 2012

(30) Foreign Application Priority Data

Nov. 30, 2010 (TW) .............................. 99141456 A
Jan. 20, 2011 (TW) ............................. 100102034 A (51) Int. Cl.
*G02B 5/02* (2006.01)
*G02B 6/42* (2006.01)
*F21V 9/16* (2006.01)
*F21V 8/00* (2006.01)

(52) U.S. Cl.
USPC ............. 362/558; 362/84; 362/551; 362/555; 385/901

(58) Field of Classification Search
USPC ........... 362/84, 551, 555, 558, 559, 560, 565, 362/569, 577, 609, 621; 385/122, 901
See application file for complete search history.

(56) References Cited

U.S. PATENT DOCUMENTS

| | | | | |
|---|---|---|---|---|
| 4,084,215 A | * | 4/1978 | Willenbrock | 362/470 |
| 4,344,110 A | * | 8/1982 | Ruediger | 362/560 |
| 4,826,273 A | * | 5/1989 | Tinder et al. | 362/488 |
| 5,134,550 A | * | 7/1992 | Young | 362/560 |
| 5,363,470 A | * | 11/1994 | Wortman | 385/147 |
| 6,337,946 B1 | * | 1/2002 | McGaffigan | 385/146 |
| 6,637,905 B1 | * | 10/2003 | Ng et al. | 362/601 |
| 6,796,698 B2 | * | 9/2004 | Sommers et al. | 362/555 |
| 7,083,315 B2 | * | 8/2006 | Hansler et al. | 362/559 |
| 7,229,201 B2 | * | 6/2007 | Krupa et al. | 362/574 |
| 7,832,886 B2 | * | 11/2010 | Lin | 362/84 |

(Continued)

FOREIGN PATENT DOCUMENTS

| | | |
|---|---|---|
| CN | 201037619 Y | 3/2008 |
| CN | 201259105 Y | 6/2009 |

(Continued)

OTHER PUBLICATIONS

"Replacement type LED Candle Lamp", Xiamen Donglin Electronic Co, CN201259105(Y), Jun. 17, 2009, English Machine Translation of CN201259105(Y), 6 pages.*

*Primary Examiner* — Alan Cariaso (74) *Attorney, Agent, or Firm* — Muncy, Geissler, Olds & Lowe, P.C.

(57) ABSTRACT

A light source for a crystal lamp has a light guide pillar, a light-emitting element, and a linear micro structure. The light guide pillar has a top surface, a bottom surface and a side surface, and the light-emitting element is disposed next to the bottom surface. The linear micro structure is formed on and surrounds the side surface, and the emitting light beams of the light-emitting element are reflected by or refracted through the linear micro structure to allow the linear micro structure to function as a thin-lined light source surrounding the light guide pillar.

8 Claims, 7 Drawing Sheets

(56) References Cited

U.S. PATENT DOCUMENTS

| | | | |
|---|---|---|---|
| 7,976,206 B2* | 7/2011 | Wu et al. | 362/555 |
| 8,292,471 B2* | 10/2012 | Boonekamp et al. | 362/311.02 |
| 8,602,621 B2* | 12/2013 | Li et al. | 362/555 |
| 2011/0216552 A1* | 9/2011 | Hattori et al. | 362/553 |
| 2012/0020108 A1* | 1/2012 | Chang | 362/555 |

FOREIGN PATENT DOCUMENTS

| | | |
|---|---|---|
| CN | 201462685 | 5/2010 |
| JP | 2010129300 A | 6/2010 |
| TW | 281554 | 7/1996 |
| TW | 3917774 | 5/2000 |
| TW | M255922 | 1/2005 |
| TW | M266549 | 6/2005 |
| TW | M342462 | 10/2008 |
| TW | 200924244 | 6/2009 |
| TW | M358240 | 6/2009 |
| TW | 201030271 | 8/2010 |
| TW | 201030281 | 8/2010 |
| TW | M385651 | 8/2010 |
| WO | WO 2010/079391 A1 | 7/2010 |

* cited by examiner

LIGHT SOURCE FOR CRYSTAL LAMP

BACKGROUND OF THE INVENTION a. Field of the Invention

The invention relates to a light source for a crystal lamp.

b. Description of the Related Art

Figure 1:
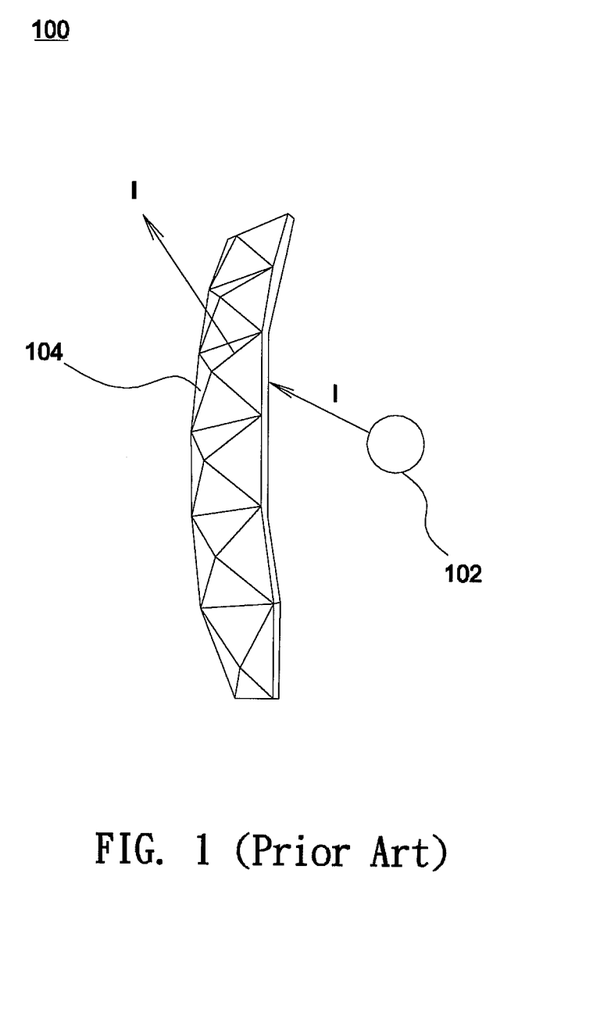
FIG. 1 shows a schematic diagram illustrating a conventional crystal lamp having multiple crystal polyhedrons
Figure 2:
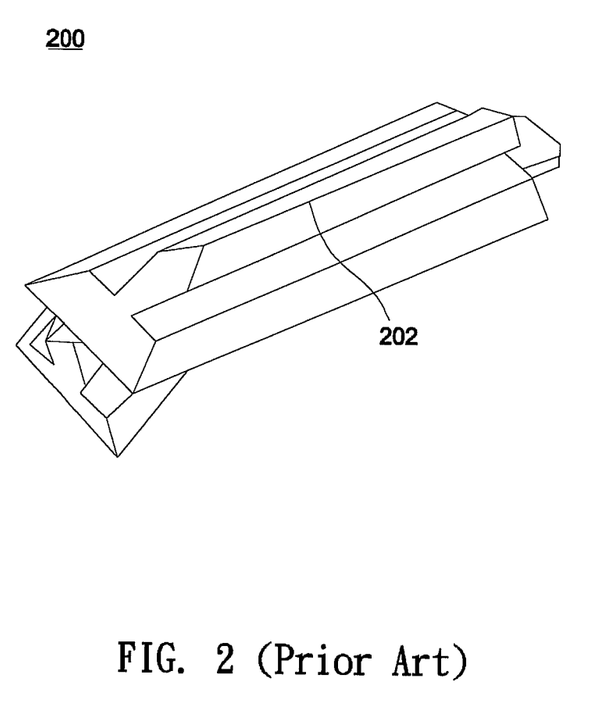
FIG. 2 shows a schematic diagram illustrating another conventional crystal lamp having multiple crystal polyhedrons

Referring to FIG. 1, a light source 102 of a conventional crystal lamp 100 is surrounded by multiple crystal polyhedrons each having multiple light-refraction walls. Though each of the crystal polyhedrons is a light dispersion element, the crystal lamp 100 fails to provide splendid and colorful visual effects because emitting light I of the light source 102 scatters in all directions and the emitting light I is refracted to a limited extent through the light refraction walls sloping at different angles. Further, as shown in FIG. 2, a side wall of a crystal lamp 200 is shaped to form a thin line 202 to enhance light-refraction effects. However, such design enhances light-refraction effects only to a limited extent. Further, Taiwan patent no. M255922 discloses a fiber design where multiple micro structures are formed on a fiber surface to enhance light-refraction effects.

Figure 3A:
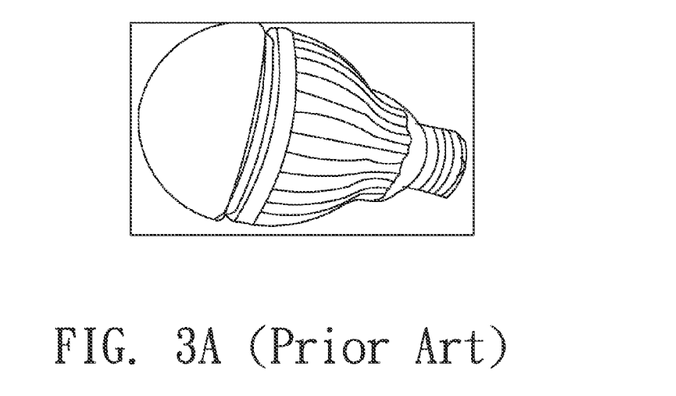
FIGS. 3A, 3B and 3C show schematic diagrams illustrating different types of conventional light sources for a crystal lamp.
Figure 3B:
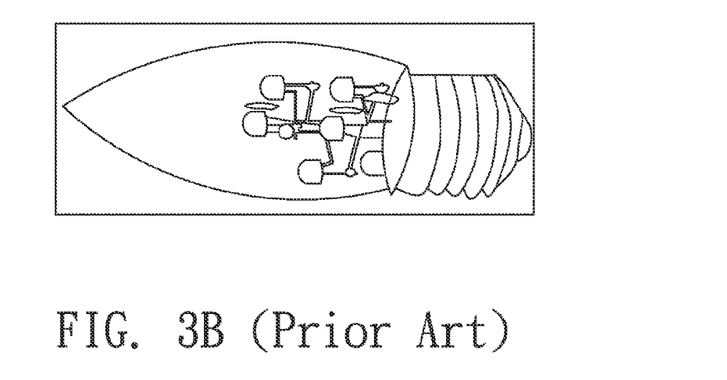
Figure 3C:
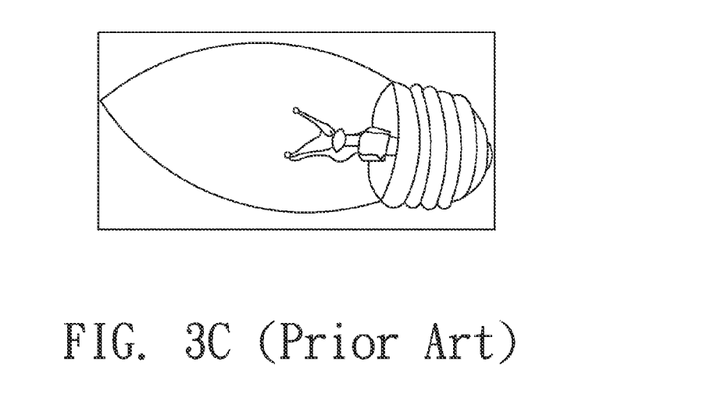

Referring to FIGS. 3A, 3B and 3C, FIG. 3A shows a lamp bulb having a high color rendering index (Ra) light source, FIG. 3B shows a lamp bulb having multiple directional light source, and FIG. 3C shows a conventional tungsten lamp having a thin-lined light source. Typically, a lamp bulb having multiple directional light sources (FIG. 3B) or a thin-lined light source (FIG. 3C) may produce better refraction effects compared with a lamp bulb having a high color rendering index (Ra) light source (FIG. 3A). Therefore, the lamp bulbs shown in FIG. 3B and FIG. 3C are more capable of providing splendid and colorful visual effects. Specifically, a crystal polyhedron may function as a light dispersion prism, and the degree of light dispersion depends on the prism material, prism shape, wavelength and incident direction of light, etc. Since multiple directional light sources and a thin-lined light source may provide highly directional light emission and are widely spread in space, enhanced light dispersion effects are allowed to be produced.

BRIEF SUMMARY OF THE INVENTION

The invention provides a linear light source for a crystal lamp to allow the crystal lamp to produce splendid and colorful visual effects.

Other objects and advantages of the invention may be further illustrated by the technical features broadly embodied and described as follows. In order to achieve one or part of or all of the above merits, an embodiment of the invention provides a light source for a crystal lamp having a light guide pillar, a light-emitting element, and a linear micro structure. The light guide pillar has a top surface, a bottom surface opposite the top surface, and a side surface connected between the top surface and the bottom surface. The light-emitting element is disposed next to the bottom surface, and emitting light of the light-emitting element enters the light guide pillar by the bottom surface. The linear micro structure is formed on and surrounds the side surface, and the emitting light of the light-emitting element is reflected by or refracted through the linear micro structure to allow the linear micro structure to function as a linear light source surrounding the light guide pillar. The light deflected by the linear micro structure passes through at least one crystal polyhedron.

According to the above embodiment, since the linear light source surrounding the side surface is allowed to provide highly directional light emission and widely spread over different regions in space, light dispersion effects of a crystal lamp quipped with the light source are considerably enhanced. In that case, emitting light of the linear micro structure passes through a crystal polyhedron to produce splendid and colorful visual effects. Besides, light emitted by the light-emitting element in a vertical direction turns to be emitted laterally by the linear micro structure to provide the effect of side emission.

Another embodiment of the invention provides a light source for a crystal lamp having a substrate, at least one light-emitting chip, a phosphor, a package body, and a transparent pillar-shaped body. The light-emitting chip is disposed on the substrate and capable of emitting short-wavelength light, and the phosphor is disposed in a transmitting path of the short-wavelength light to transform the short-wavelength light into white light. The package body is disposed on the substrate to seal the light-emitting chip and the phosphor, and the transparent pillar-shaped body is disposed on the package body. A linear micro structure is formed on a side surface of the transparent pillar-shaped body, and the white light is reflected by or refracted through the linear micro structure to allow the linear micro structure to function as a linear light source. The white light deflected by the linear micro structure passes through at least one crystal polyhedron.

According to the above embodiment, the transparent pillar-shaped body with the linear micro structure and the package body are made of the same material and formed in the same process of packaging the light-emitting chip to therefore simplify fabrication processes.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 4:
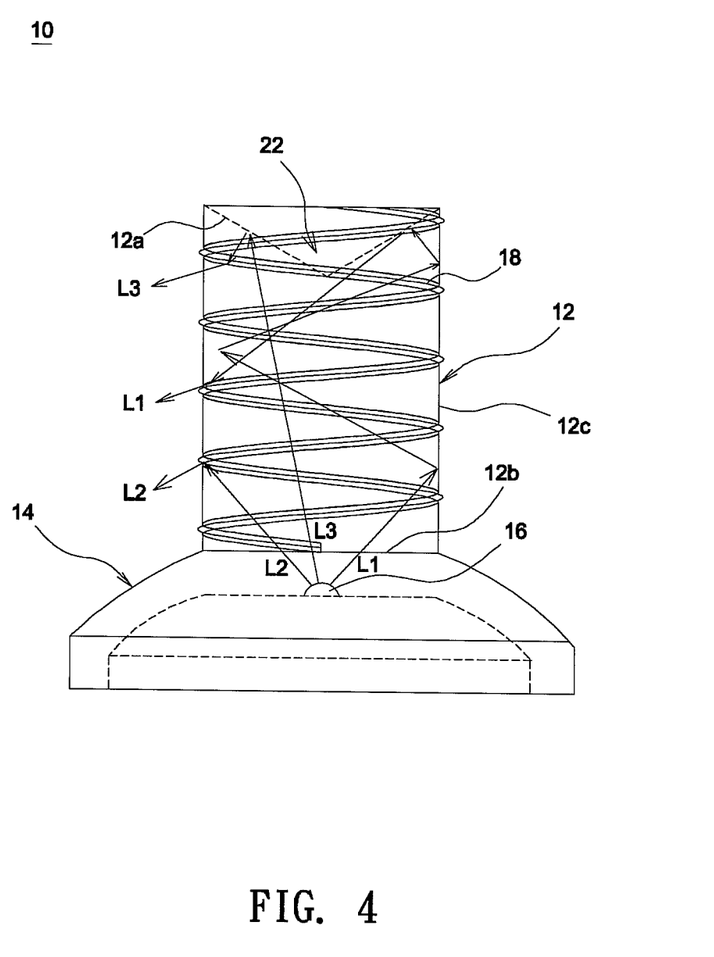
FIG. 4 shows a schematic diagram of a light source for a crystal lamp according to an embodiment of the invention.

FIG. 4 shows a schematic diagram of a light source for a crystal lamp according to an embodiment of the invention. Referring to FIG. 4, a light source 10 for a crystal lamp includes a light guide pillar 12, a base 14, and a light-emitting element 16. The light guide pillar 12 has a top surface 12a, a bottom surface 12b opposite the top surface 12a, and a side surface 12c connected between the top surface 12a and the bottom surface 12b. A linear micro structure 18 is formed on and surrounds the side surface 12c. In this embodiment, the linear micro structure 18 may be a V-shaped prism structure that is continuously formed on and surrounds the side surface 12c. A notch structure 22 is formed on the top surface 12a of the light guide pillar 12 and concave towards the inside of the light guide pillar 12. The shape of the notch structure 22 is not restricted. For example, the notch structure 22 may be in the shape of a pyramid, a corn or a prism to have a V-shaped or an arc-shaped cross-section. The light guide pillar 12 is disposed on the base 14, and the light-emitting element 16 such as a light-emitting diode is disposed on one side of the base 14 facing the light guide pillar 12 and next to the bottom surface 12b of the light guide pillar 12. Emitting light beams of the light-emitting element 16 enter the light guide pillar 12 by the bottom surface 12b. As shown in FIG. 4, a light beam L1 is totally reflected inside the light guide pillar 12, reflected by the top surface 12a of the notch structure 22, and then reflected by or refracted through the linear micro structure 18 to leave the light guide pillar 12. A light beam L2 is directly reflected by or refracted through the linear micro structure 18 to leave the light guide pillar 12. A light beam L3 is directly reflected by the notch structure 22 and then reflected by or refracted through the linear micro structure 18 to leave the light guide pillar 12. Therefore, emitting light beams of the light-emitting element 16 traveling in different directions are allowed to be gathered around and then emitted by the linear micro structure 18. In conclusion, the linear micro structure 18 may produce light-condensing effects and hence functions as a linear light source surrounding the side surface 12c of the light guide pillar 12. According to the above embodiments, since the linear light source 10 surrounding the side surface 12c is allowed to provide highly directional light emission and widely spread over different regions in space, light dispersion effects of a crystal lamp quipped with the light source 10 are considerably enhanced. In that case, emitting light beams of the linear micro structure 18 pass through a crystal polyhedron to produce splendid and colorful visual effects. Besides, light beams emitted by the light-emitting element 16 in a vertical direction turn to be emitted laterally by the linear micro structure 18 to provide the effect of side emission.

Figure 5A:
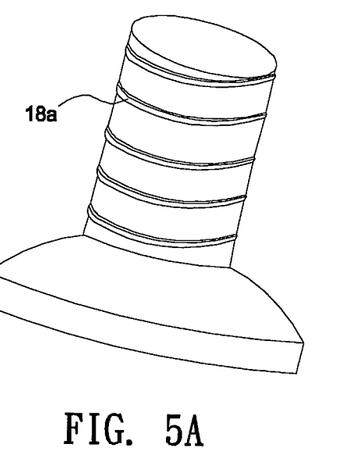
FIG. 5A shows a schematic diagram illustrating a linear micro structure having a V-shaped prism structure.
Figure 5B:
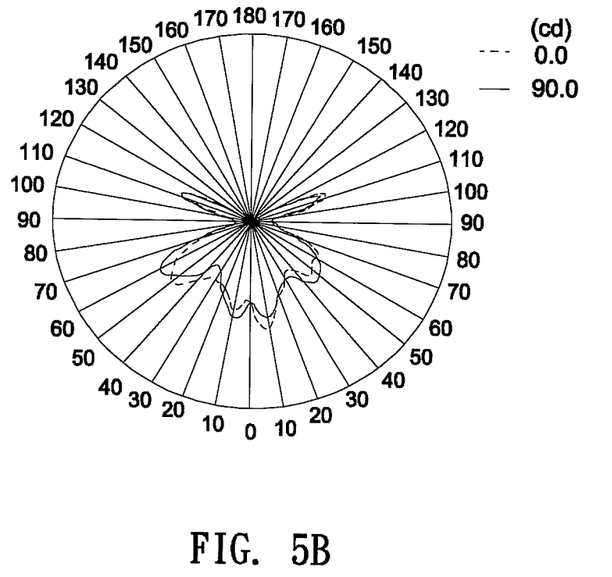
FIG. 5B shows light-emitting angles and a light-emitting distribution of the linear micro structure shown in FIG. 5A.
Figure 6A:
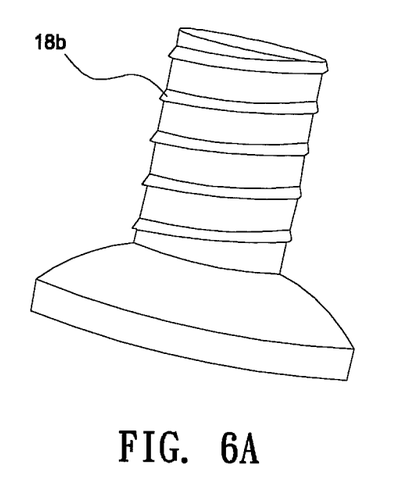
FIG. 6A shows a schematic diagram illustrating a linear micro structure having an eaves-shaped prism structure.
Figure 6B:
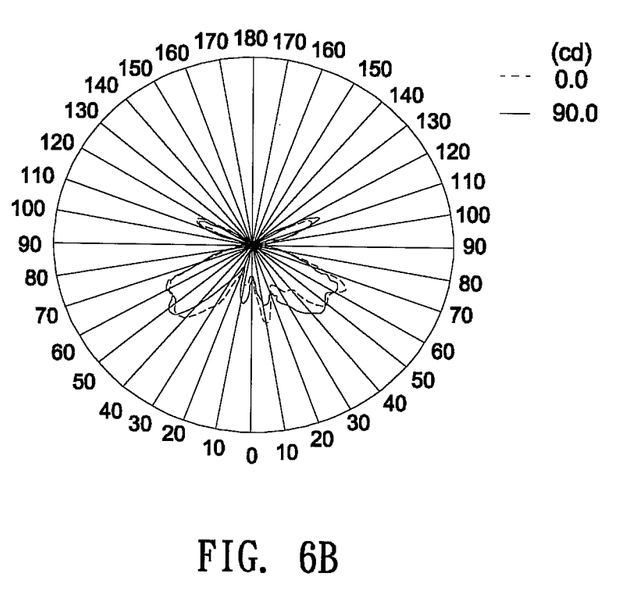
FIG. 6B shows light-emitting angles and a light-emitting distribution of the linear micro structure shown in FIG. 6A.

FIG. 5A shows a schematic diagram illustrating a linear micro structure 18a having a V-shaped prism structure, and FIG. 5B shows light-emitting angles and a light-emitting distribution of the linear micro structure 18a shown in FIG. 5A. FIG. 6A shows a schematic diagram illustrating a linear micro structure 18b having an eaves-shaped prism structure, and FIG. 6B shows light-emitting angles and a light-emitting distribution of the linear micro structure 18b shown in FIG. 6A. According to the above embodiments, the shape of a linear micro structure 18 is not restricted, as long as a light-condensing effect is provided. Therefore, as shown in FIGS. 5B and 6B, the light-emitting distribution of the light source 10 is allowed to be adjusted by varying the shape of the linear micro structures 18a and 18b In one embodiment, the notch structure 22 and the linear micro structure 18a are both V-shaped, and the size and cross-section of the V-shaped notch structure 22 are set to be larger than the size and cross-section of the V-shaped linear micro structure 18, and an apex angle of the V-shaped notch structure 22 is in the range of 90 to 130 degrees. Besides, a reflective layer may be coated on a surface of the notch structure 22 to further increase surface reflectivity. By adjusting the distribution, size or surface inclined angle of the notch structure 22 and the linear micro structure 18, light-emitting characteristics and dispersion effects of a spiral linear light source are optimized.

Figure 7:
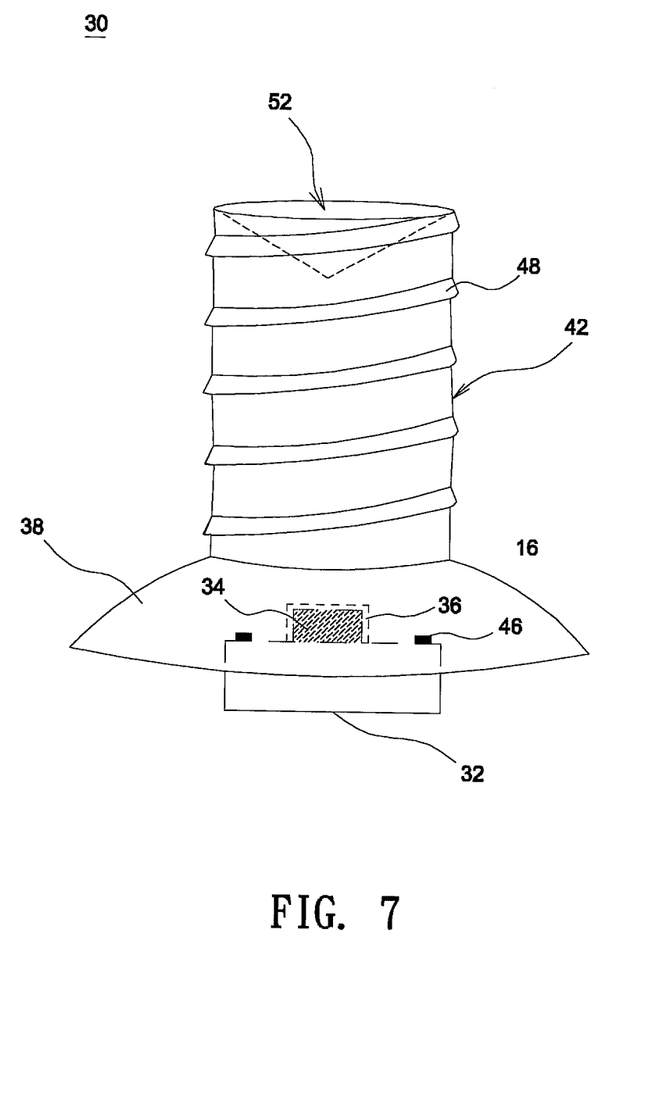
FIG. 7 shows a schematic diagram of a light source for a crystal lamp according to another embodiment of the invention.

FIG. 7 shows a schematic diagram of a light source for a crystal lamp according to another embodiment of the invention. In this embodiment, a light-emitting chip is directly packaged by a pillar-shaped body having a linear micro structure. Referring to FIG. 7, a light source 30 for a crystal lamp includes a substrate 32, at least one light-emitting chip 34, a phosphor 36, a package body 38 and a transparent pillar-shaped body 42. The light-emitting chip 34 is disposed on the substrate 32 and capable of emitting short-wavelength light, and the phosphor 36 is disposed in a transmitting path of the short-wavelength light to transform the short-wavelength light into white light. For example, the light-emitting chip 34 may be a blue LED chip or an ultraviolet LED chip, and the phosphor 36 may be yellow phosphor powder. The package body 38 is disposed on the substrate 32 to seal the light-emitting chip 34 and the phosphor 36. The transparent pillar-shaped body 42 is formed on the package body 38, and a linear micro structure 48 is formed on a side surface of the transparent pillar-shaped body 42. The white light is reflected by or refracted through the linear micro structure 48 to allow the linear micro structure 48 to function as a linear light source. Therefore, the white light deflected by the linear micro structure 48 passes through a crystal polyhedron to similarly produce splendid and colorful visual effects. According to the above embodiment, the transparent pillar-shaped body 42 with the linear micro structure 48 and the package body 38 are made of the same material and formed in the same process of packaging the light-emitting chip 34 to therefore simplify fabrication processes. Further, the transparent pillar-shaped body 42 and the package body 38 may be made of at least one of silicone gel, acrylic, rubber, plastic, epoxy resin, polyethylene, polyvinyl chloride, polystyrene and polypropylene. Further, the light-emitting chip 34 may be connected to a circuit 46 on the substrate 32 through metal wiring or flip chip bonding. Similarly, a notch structure 52 may be formed on a top surface of the transparent pillar-shaped body 42.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred.

What is claimed is:

1. A light source for a crystal lamp, comprising:
    a substrate;
    at least one light-emitting chip disposed on the substrate and capable of emitting short-wavelength light;
    a phosphor disposed in a transmitting path of the short-wavelength light to transform the short-wavelength light into white light;
    a package body disposed on the substrate to seal the light-emitting chip and the phosphor;
    a transparent pillar-shaped body disposed on the package body, wherein a linear micro structure protrudes from and spirally and continuously surrounds a side surface of the transparent pillar-shaped body, the white light is reflected by or refracted through the linear micro structure to allow the linear micro structure to function as a linear light source; and
    at least one notch structure formed on a top surface of the transparent pillar-shaped body and concave towards the inside of the transparent pillar-shaped body.

2. The light source for a crystal lamp as claimed in claim 1, wherein each of the package body and the transparent pillar-shaped body is made of at least one of silicone gel, acrylic, rubber, plastic, epoxy resin, polyethylene, polyvinyl chloride, polystyrene and polypropylene.

3. The light source for a crystal lamp as claimed in claim 2, wherein the transparent pillar-shaped body and the package body are made of the same material and formed in the same process of packaging the light-emitting chip.

4. The light source for a crystal lamp as claimed in claim 1, wherein the light-emitting chip is a blue LED chip or an ultraviolet LED chip, and the phosphor comprises yellow phosphor powder.

5. The light source for a crystal lamp as claimed in claim 1, wherein the linear micro structure is a V-shaped prism structure or an eaves-shaped prism structure.

6. The light source for a crystal lamp as claimed in claim 1, wherein the notch structure has a V-shaped cross-section.

7. The light source for a crystal lamp as claimed in claim 6, wherein an apex angle of the V-shaped notch structure is in the range of 90 to 130 degrees.

8. The light source for a crystal lamp as claimed in claim 1, further comprising:
    a reflective layer coated on a surface of the notch structure.

\* \* \* \* \*